US010267637B2

United States Patent
Jeong et al.

(10) Patent No.: US 10,267,637 B2
(45) Date of Patent: Apr. 23, 2019

(54) SYSTEM AND METHOD FOR PROVIDING NAVIGATION INFORMATION BASED ON AN OPERATING MODE

(71) Applicant: Samsung Electronics Co., Ltd, Gyeonggi-do (KR)

(72) Inventors: Dae-yeon Jeong, Gyeonggi-do (KR); Hyun-suk Min, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/711,452

(22) Filed: Dec. 11, 2012

(65) Prior Publication Data

US 2013/0151151 A1 Jun. 13, 2013

(30) Foreign Application Priority Data

Dec. 13, 2011 (KR) .................... 10-2011-0133999

(51) Int. Cl.
*G01C 21/00* (2006.01)
*G01C 21/36* (2006.01)
(Continued)

(52) U.S. Cl.
CPC ......... *G01C 21/00* (2013.01); *G01C 21/3423* (2013.01); *G01C 21/3679* (2013.01); *G08G 1/0112* (2013.01); *G08G 1/0133* (2013.01); *G08G 1/052* (2013.01); *G08G 1/0962* (2013.01); *G08G 1/096816* (2013.01); *G08G 1/096844* (2013.01)

(58) Field of Classification Search
CPC .............. G06F 17/30; G08G 1/096844; G01G 1/096827

USPC ................ 701/200, 201, 202, 208, 213, 537
See application file for complete search history.

(56) References Cited

U.S. PATENT DOCUMENTS 6,542,812 B1    4/2003  Obradovich et al.
7,062,374 B1 * 6/2006  Walters et al. ............... 701/491
(Continued)

FOREIGN PATENT DOCUMENTS

EP         1731874 A2    12/2006
JP      2004-361363 A   12/2004
(Continued)

OTHER PUBLICATIONS

International Search Report dated Feb. 22, 2013 in connection with International Patent Application No. PCT/KR2012/010402.
(Continued)

*Primary Examiner* — Jelani A Smith
*Assistant Examiner* — Kelly D Williams

(57) ABSTRACT

A navigation information providing server based on an operation mode, the navigation information providing server including a movement information reception unit which receives information associated with a movement of a user terminal, an operation mode determination unit which determines whether an operation mode of navigation is changed, based on the received information associated with the movement of the user terminal, and a navigation information providing unit which changes navigation information according to the determination regarding the change of the operation mode and provides the changed navigation information to the user terminal.

25 Claims, 10 Drawing Sheets

(51) Int. Cl.
*G01C 21/34* (2006.01)
*G08G 1/01* (2006.01)
*G08G 1/052* (2006.01)
*G08G 1/0962* (2006.01)
*G08G 1/0968* (2006.01)

(56) References Cited

U.S. PATENT DOCUMENTS

| | | | |
|---|---|---|---|
| 2002/0169551 A1* | 11/2002 | Inoue et al. | 701/213 |
| 2003/0088359 A1* | 5/2003 | Park et al. | 701/200 |
| 2004/0204840 A1 | 10/2004 | Hashima et al. | |
| 2006/0200284 A1 | 9/2006 | Hwang | |
| 2007/0005237 A1* | 1/2007 | Needham et al. | 701/202 |
| 2007/0203641 A1* | 8/2007 | Diaz et al. | 701/208 |
| 2007/0219706 A1* | 9/2007 | Sheynblat | G01C 21/3679 701/532 |
| 2008/0027634 A1* | 1/2008 | Obradovich et al. | 701/208 |
| 2008/0167801 A1* | 7/2008 | Geelen | G01C 21/3641 701/533 |
| 2008/0243370 A1* | 10/2008 | Loera et al. | 701/201 |
| 2010/0004860 A1* | 1/2010 | Chernoguz | G01C 22/006 701/494 |
| 2010/0305842 A1 | 12/2010 | Feng | |
| 2011/0022299 A1 | 1/2011 | Feng et al. | |
| 2011/0046879 A1* | 2/2011 | Celli | G01C 21/3682 701/408 |
| 2011/0059759 A1 | 3/2011 | Ban | |
| 2011/0066363 A1* | 3/2011 | Kimishima | 701/200 |
| 2011/0066364 A1 | 3/2011 | Hale | |
| 2011/0077853 A1* | 3/2011 | Ranford et al. | 701/201 |
| 2011/0118976 A1 | 5/2011 | Harding | |
| 2011/0270517 A1* | 11/2011 | Benedetti | G01C 21/20 701/533 |
| 2015/0177013 A1* | 6/2015 | Siliski | G01C 21/20 701/433 |

FOREIGN PATENT DOCUMENTS

| | | |
|---|---|---|
| JP | 2006-292596 A | 10/2006 |
| JP | 2008-286577 | 11/2008 |
| KR | 10-2004-0083338 | 10/2004 |
| KR | 10-2006-0030183 | 4/2006 |
| KR | 10-2006-0062120 | 6/2006 |
| KR | 10-2006-0097836 A | 9/2006 |
| KR | 10-2010-0071793 | 6/2010 |
| WO | WO 2004/084437 A1 | 9/2004 |
| WO | WO 2011/047697 A1 | 4/2011 |

OTHER PUBLICATIONS

Written Opinion of International Searching Authority dated Feb. 22, 2013 in connection with International Patent Application No. PCT/KR2012/010402.
Partial Supplementary European Search Report dated Sep. 9, 2015 in connection with European Patent Application No. 12858452.1; 5 pages.
Extended European Search Report issued for EP 12858452.1 dated Jan. 15, 2016, 10 pgs.
Communication from a foreign patent office in a counterpart foreign application, KIPO, Notice of Non-Final Rejection for Application No. KR 10-2011-0133999, dated Jun. 5, 2018, 54 pages.
Korean Intellectual Property Office, "Notice of Final Rejection," Application No. KR10-2011-0133999, dated Dec. 20, 2018, 8 pages.
Korean Intellectual Property Office Notice of Final Rejection dated Feb. 19, 2019, regarding Application No. 10-2011-0133999, 8 pages.

* cited by examiner

FIG. 8

| OPERATION MODE / 10 | POI / 12 | ROUTE / 14 |
|---|---|---|
| DRIVING MODE | LANDMARK, GAS STATION CAR REPAIR SHOP, ... | ALLEY, MAIN ROAD, ... |
| WALKING MODE | CONVENIENCE STORE, STATIONARY STORE, COFFEE SHOP, ... | ALLEY, ... |
| ... | ... | ... |

FIG. 9

| FUEL QUANTITY / 20 | MILEAGE / 22 | POI / 24 |
|---|---|---|
| LOW | 100,000km | GAS STATION |
| HIGH | 115,000km | CAR REPAIR SHOP |
| LOW | 115,000km | GAS STATION, CAR REPAIR SHOP |
| ... | ... | ... |

SYSTEM AND METHOD FOR PROVIDING NAVIGATION INFORMATION BASED ON AN OPERATING MODE

CROSS-REFERENCE TO RELATED APPLICATION(S) AND CLAIM OF PRIORITY

The present application is related to and claims the benefit of Korean Patent Application No. 10-2011-0133999, filed on Dec. 13, 2011, in the Korean Intellectual Property Office, the disclosure of which is incorporated herein in its entirety by reference.

TECHNICAL FIELD OF THE INVENTION

The present invention generally relates to navigation system, and more particularly, to a system and method of providing navigation information based on an operation mode.

BACKGROUND OF THE INVENTION

Navigation systems generally determine a current location of a vehicle according to location information received from global positioning system (GPS) satellites, match the determined current location of the vehicle with map data, and provide the current location of the vehicle together with a map. Using these navigation systems, a user can check a current location of a vehicle and a shortest route between the current location of the vehicle and a destination using such a navigation system, and can plan a driving route of the vehicle in advance according with a guide feature of the navigation system. Thus, the user can drive the vehicle along the planned route, thereby efficiently making use of a road network.

However, in the conventional art, it is impossible to efficiently provide differentiated navigation information according to movements of a vehicle and to efficiently provide users of a navigation system with information associated with the vicinity of a driving route.

SUMMARY OF THE INVENTION

To address the above-discussed deficiencies of the prior art, it is a primary object to provide a system and method based on an operation mode.

The present invention also provides a navigation information providing system and method based on an operation mode, configured to convert and provide navigation information that includes different Points Of Interest (POIs) and different routes according to a change of a navigation operation mode.

The present invention also provides a navigation information providing system and method based on an operation mode, configured to provide navigation information based on an operation mode of navigation and a state of a vehicle.

According to an aspect of the present invention, there is provided a navigation information providing server based on an operation mode, the navigation information providing server including a movement information reception unit which receives information associated with a movement of a user terminal, an operation mode determination unit which determines whether an operation mode of navigation is changed, based on the received information associated with the movement of the user terminal, and a navigation information providing unit which changes navigation information according to the determination regarding the change of the operation mode and provides the changed navigation information to the user terminal.

The operation mode determination unit may identify a change of a moving speed of the user terminal based on the received information associated with the movement of the user terminal and determine, based on the change of the moving speed, whether the operation mode is changed.

When the operation mode changes, the navigation information providing unit may provide navigation information corresponding to the changed operation mode to the user terminal.

The navigation information providing unit may provide Point Of Interest (POI) information corresponding to the changed operation mode to the user terminal.

The operation mode may include a driving mode and a walking mode, and the navigation information providing unit may provide POI information associated with vehicle driving to the user terminal when the operation mode is a driving mode.

The operation mode may include a driving mode and a walking mode, and the navigation information providing unit may provide POI information associated with a user walking to the user terminal when the operation mode is a walking mode.

The navigation information providing unit may provide route information corresponding to the changed operation mode to the user terminal.

The navigation information providing unit may generate the route information according to a route search criterion corresponding to the changed operation mode.

The navigation information providing server may further include a vehicle information collection unit which collects vehicle information associated with states of a vehicle, wherein the navigation information providing unit may generate navigation information corresponding to the changed operation mode based on the collected vehicle information.

The vehicle information may include at least one of information associated with fuel quantity of the vehicle and information associated with mileage of the vehicle, and the navigation information may include POI information associated with at least one of a gas station and a car repair shop.

According to another aspect of the present invention, there is provided a navigation information providing server based on an operation mode, the navigation information providing server including an operation mode verifying unit which receives an operation mode of navigation determined based on a movement pattern of the user terminal and verifies whether the operation mode of the user terminal has been changed, and a navigation information providing unit which provides the user terminal with navigation information corresponding to the changed operation mode.

The movement pattern of the user terminal may include information associated with a change of a moving speed of the user terminal.

The navigation information providing unit may include Point Of Interest (POI) information corresponding to the changed operation mode to the user terminal.

The operation mode may include a driving mode and a walking mode, and the navigation information providing unit may provide POI information associated with vehicle driving to the user terminal when the operation mode is a driving mode.

The operation mode may include a driving mode and a walking mode, and the navigation information providing unit may provide POI information associated with a user walking to the user terminal when the operation mode is a walking mode.

The navigation information providing unit may provide route information corresponding to the changed operation mode to the user terminal.

The navigation information providing unit may generate the route information according to a route search criterion corresponding to the changed operation mode.

The navigation information providing server may further include a vehicle information collection unit which collects vehicle information associated with states of a vehicle, wherein the navigation information providing unit may generate navigation information corresponding to the changed operation mode based on the collected vehicle information.

According to another aspect of the present invention, there is provided a user terminal which receives navigation information based on an operation mode, the user terminal including a movement information collection unit which collects information associated with a movement of the user terminal and provides the collected movement information to a server, a navigation information reception unit which receives navigation information corresponding to a changed operation mode of navigation from the server, and a display unit which displays the received navigation information, wherein a change or a non-change of the operation mode of navigation is determined based on the movement information by the server, and the received navigation information is generated based on the changed operation mode by the server.

The change or the non-change of the operation mode of navigation may be determined by the server based on a change of a moving speed of the user terminal.

The received navigation information may include at least one of POI information and route information both corresponding to the changed operation mode.

The received navigation information may be generated by the server based on information associated with states of a vehicle.

The operation mode may include a driving mode and a walking mode.

According to another aspect of the present invention, there is provided a user terminal which receives navigation information based on an operation mode, the user terminal including a movement information collection unit which collects information associated with a movement of a user terminal, an operation mode determination unit which determines whether an operation mode of navigation is changed, based on the information associated with the movement of the user terminal, a navigation information request unit which requests a server for navigation information corresponding to the changed operation mode, a navigation information reception unit which receives navigation information corresponding to the changed operation mode from the server, and a display unit which displays the received navigation information.

The operation mode determination unit may determine a change or a non-change of the operation mode based on a change of a moving speed of the user terminal.

The received navigation information may include at least one of POI information and route information both corresponding to the changed operation mode.

The received navigation information may be generated by the server based on information associated with states of a vehicle.

The operation mode may include a driving mode and a walking mode.

According to another aspect of the present invention, there is provided a user terminal which provides navigation information based on an operation mode, the user terminal including a movement information collection unit which collects information associated with a movement of a user terminal, an operation mode determination unit which determines whether an operation mode of navigation is changed, based on the information associated with the movement of the user terminal, a navigation information generation unit which generates navigation information corresponding to the changed operation mode, and a display unit which displays the generated navigation information.

According to another aspect of the present invention, there is provided a navigation information providing method based on an operation mode, the navigation information providing method including receiving information associated with a movement of a user terminal from the user terminal, determining whether an operation mode of navigation is changed, based on the received information associated with the movement of the user terminal, and changing navigation information according to the determination regarding the change of the operation mode and provides the changed navigation information to the user terminal.

According to another aspect of the present invention, there is provided a navigation information providing method based on an operation mode, the navigation information providing method including receiving an operation mode of navigation determined based on a movement pattern of a user terminal, from the user terminal, verifying whether the operation mode of the user terminal has been changed, and providing the user terminal with navigation information corresponding to the changed operation mode.

According to another aspect of the present invention, there is provided a method of receiving navigation information based on an operation mode, the method including collecting information associated with a movement of the user terminal and providing the collected movement information to a server, receiving navigation information corresponding to a changed operation mode of navigation from the server, and displaying the received navigation information, wherein a change or a non-change of the operation mode of navigation is determined based on the movement information by the server, and the received navigation information is generated based on the changed operation mode by the server.

According to another aspect of the present invention, there is provided a method of receiving navigation information based on an operation mode, the method including collecting information associated with a movement of a user terminal, determining whether an operation mode of navigation is changed, based on the information associated with the movement of the user terminal, requesting a server for navigation information corresponding to the changed operation mode, receiving navigation information corresponding to the changed operation mode from the server, and displaying the received navigation information.

According to another aspect of the present invention, there is provided a method of providing navigation information based on an operation mode, the method including collecting information associated with a movement of a user terminal, determining whether an operation mode of navigation is changed, based on the information associated with the movement of the user terminal, generating navigation information corresponding to the changed operation mode, and displaying the generated navigation information.

According to another aspect of the present invention, there is provided a computer readable recording medium having recorded thereon a computer program for executing the above method of receiving navigation information based on an operation mode, the method including collecting information associated with a movement of the user terminal and providing the collected movement information to a server, receiving navigation information corresponding to a changed operation mode of navigation from the server, and displaying the received navigation information, wherein a change or a non-change of the operation mode of navigation is determined based on the movement information by the server, and the received navigation information is generated based on the changed operation mode by the server.

According to another aspect of the present invention, there is provided a computer readable recording medium having recorded thereon a computer program for executing the above method of receiving navigation information based on an operation mode, the method including collecting information associated with a movement of a user terminal, determining whether an operation mode of navigation is changed, based on the information associated with the movement of the user terminal, requesting a server for navigation information corresponding to the changed operation mode, receiving navigation information corresponding to the changed operation mode from the server, and displaying the received navigation information.

According to another aspect of the present invention, there is provided a computer readable recording medium having recorded thereon a computer program for executing the above method of providing navigation information based on an operation mode, the method including collecting information associated with a movement of a user terminal; determining whether an operation mode of navigation is changed, based on the information associated with the movement of the user terminal, generating navigation information corresponding to the changed operation mode, and displaying the generated navigation information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of a criterion on which navigation information is produced based on an operation mode, according to an embodiment of the present invention;

FIG. 9 illustrates an example of a criterion on which Points Of Interest (POIs) are selected in a driving mode according to states of a vehicle, according to an embodiment of the present invention;

DETAILED DESCRIPTION OF THE INVENTION

Figure 1:
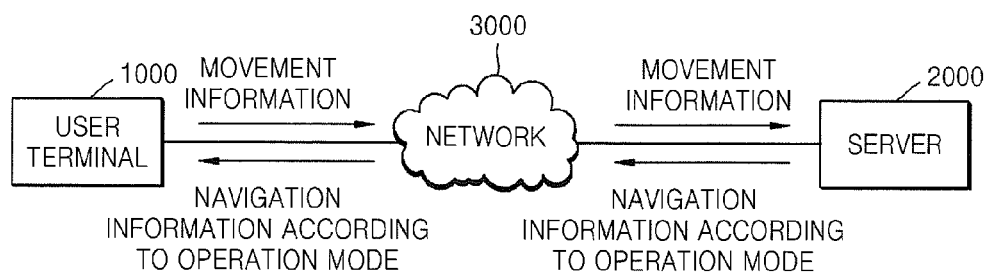
FIG. 1 illustrates an example navigation information providing system according to an embodiment of the present invention.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged navigation devices. The present invention will now be described more fully with reference to the accompanying drawings, in which exemplary embodiments of the invention are shown. The invention may, however, be embodied in many different forms and should not be construed as being limited to the embodiments set forth herein. In the drawings, parts irrelevant to the description are omitted for simplicity of explanation, and like numbers refer to like elements throughout.

It will be understood that when an element is referred to as being "connected" to another element, it can be directly connected to the other element or intervening elements may be present. It will be further understood that the terms "comprises" and/or "comprising," or "includes" and/or "including" when used in this disclosure, specify the presence of stated elements, but do not preclude the presence or addition of one or more other elements. Expressions such as "at least one of," when preceding a list of elements, modify the entire list of elements and do not modify the individual elements of the list.

In this disclosure, navigation information denotes information associated with a route to a destination, and includes, for example, information associated with a route to a destination, Points Of Interest (POIs) along the route, an arrival time, speed limit enforcement areas, and lanes of travel.

Also, in this disclosure, an operation mode of navigation is determined according to a movement pattern of a user terminal that may be used to generate differentiated navigation information. The operation mode includes, for example, a driving mode and a walking mode. The driving mode may be a mode for providing navigation information associated with vehicle driving, while the walking mode may be a mode for providing navigation information associated with a user who is walking.

In addition, movement information in this disclosure is information associated with movements of a user terminal. In addition, the movement information includes information associated with a moving speed, a moving direction and a moving period of time of the user terminal and information associated with a motion (shaking) of the user terminal.

The present invention will now be described more fully with reference to the accompanying drawings, in which exemplary embodiments of the invention are shown.

FIG. 1 illustrates an example navigation information providing system according to an embodiment of the present invention.

Referring to FIG. 1, in the navigation information providing system, a user terminal 1000 is coupled to a server 2000 via a network 3000 and receives navigation information from the server 2000 and displays it.

The user terminal 1000 may collect and provide information associated with a movement of the user terminal 1000 to the server 2000, and the server 2000 may determine an operation mode of navigation by using the movement information received from the user terminal 1000. The server 2000 may determine whether the operation mode of navigation has changed, by using the movement information received from the user terminal 1000, may generate navigation information according to a changed operation mode, and may provide the navigation information to the user terminal 1000. In addition, the server 2000 may collect information associated with states of a vehicle (not shown) from a vehicle management terminal (not shown) included in the vehicle or the user terminal 1000 coupled to the vehicle management terminal. The server 2000 may also generate navigation information based on the collected information associated with the states of the vehicle.

Accordingly, a user of the vehicle may receive navigation information suitable for driving the vehicle via the user terminal 1000 while the vehicle is moving. When the user gets out of the vehicle and walks, the user may receive navigation information suitable for walking via the user terminal 1000.

Examples of the user terminal 1000 include all terminals that may be coupled to the server 2000 via a network. For example, the user terminal 1000 may include a smart phone, a cellular phone, a personal digital assistant (PDA), a navigation device, and a tablet PC.

The network 3000 is a data communication network that enables network components shown in FIG. 1 to communicate with one another. Examples of the network 3000 include a wired Internet, a wireless Internet, and a mobile wireless communication network.

The server 2000 will now be described in greater detail with reference to FIG. 2.

Figure 2:
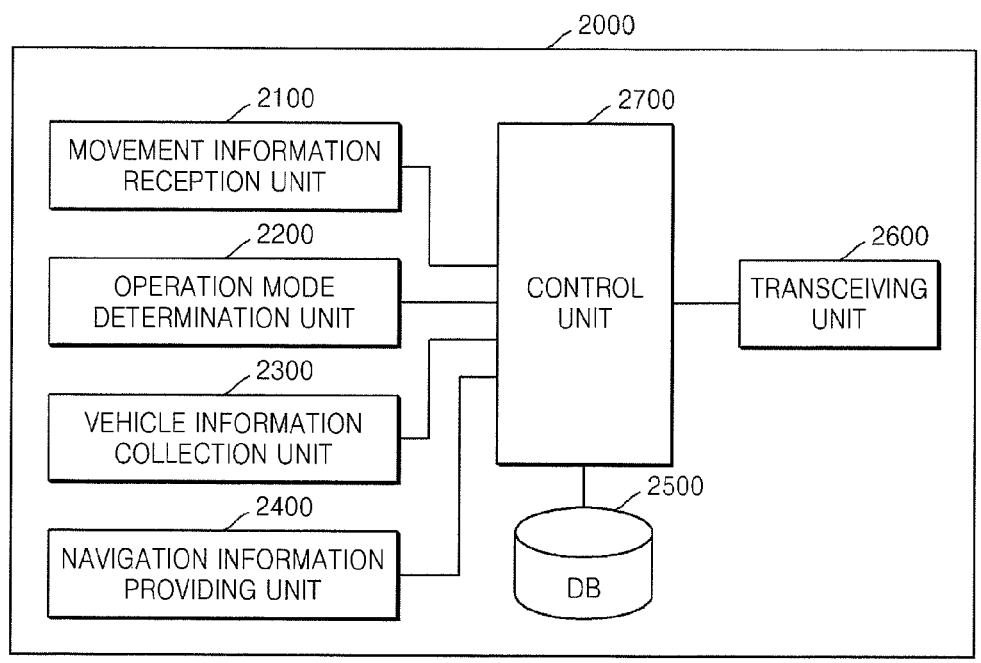
FIG. 2 illustrates an example server included in the navigation information providing system illustrated in FIG. 1.

FIG. 2 is a block diagram of a structure of the server 2000 of FIG. 1.

Referring to FIG. 2, the server 2000 includes a movement information reception unit 2100, an operation mode determination unit 2200, a vehicle information collection unit 2300, a navigation information providing unit 2400, a database (DB) 2500, a transceiving unit 2600, and a control unit 2700.

The movement information reception unit 2100 receives information associated with a movement of the user terminal 1000 from the user terminal 1000. The movement information may be collected via a sensor included in the user terminal 1000. The movement information received from the user terminal 1000 includes information of a moving speed of the user terminal 1000 and information of a period of time during which a moving speed is maintained. For example, the movement information reception unit 2100 may receive movement information such as a moving speed of approximately 70km/h 80km/h of the user terminal 1000 and a period of time of 5 minutes during which a moving speed of 20 km/h or more is maintained.

The operation mode determination unit 2200 determines an operation mode of navigation based on the received movement information. The operation mode determination unit 2200 may analyze a movement pattern of the user terminal 1000 based on the moving speed of the user terminal 1000 and a period of time during which a moving speed is maintained, and may determine an operation mode of navigation according to the analyzed movement pattern of the user terminal 1000. The operation mode of navigation includes a driving mode associated with vehicle driving and a walking mode associated with a user walking. In other embodiments, may include other types.

For example, the operation mode determination unit 2200 may determine the operation mode to be a driving mode, when the moving speed of the user terminal 1000 is 20 km/h or more. The operation mode determination unit 2200 may also determine the operation mode to be a driving mode when an increase and a decrease of the moving speed of the user terminal 1000 in the range of 0 km/h to 10 km/h are repeated for a preset number of times or more. For example, the operation mode determination unit 2200 may determine the operation mode to be a walking mode when a moving speed of 3 km/h to 5 km/h is maintained for a predetermined period of time or more. The operation mode determination unit 2200 may also determine the operation mode to be a walking mode when the average of moving speeds of a user belongs to a walking speed range.

Alternatively, the operation mode determination unit 2200 may determine the operation mode based on a motion of the user terminal 1000. In this case, the operation mode determination unit 2200 may determine the operation mode to be a walking mode when a motion of the user terminal 1000 has a similar pattern to a motion generated during walking.

Alternatively, the operation mode determination unit 2200 may determine the operation mode based on whether a user is able to transmit data to and receive data from the vehicle management terminal included in the vehicle. In this case, the operation mode determination unit 2200 may be coupled to the vehicle management terminal via a network and may receive and verify a terminal ID from the vehicle management terminal.

The vehicle information collection unit 2300 collects information associated with states of the vehicle. The information about the states of the vehicle may be used by the navigation information providing unit 2400, which will be described later, to generate navigation information. For example, the information about the states of the vehicle may include information of fuel quantity of the vehicle, information of mileage of the vehicle, and information associated with whether a device included in the vehicle malfunctions. The information associated with the states of the vehicle may be collected by the vehicle management terminal included in the vehicle and provided to the vehicle information collection unit 2300.

The vehicle information collection unit 2300 may receive the information associated with the states of the vehicle from the vehicle management terminal included in the vehicle. In this case, the vehicle information collection unit 2300 may receive information for connection to the vehicle management terminal from the user terminal 1000 and may request the vehicle management terminal for the information associated with the states of the vehicle by using the received information.

Alternatively, the vehicle information collection unit 2300 may collect the information associated with the states of the vehicle from the user terminal 1000. In this case, the user terminal 1000 may receive the information associated with the states of the vehicle from the vehicle management terminal and provide the same to the vehicle information collection unit 2300.

The navigation information providing unit 2400 generates navigation information according to an operation mode and provides the same to the user terminal 1000. When the operation mode changes, the navigation information providing unit 2400 may provide navigation information corresponding to the changed operation mode to the user terminal 1000.

When the operation mode is a driving mode, the navigation information providing unit 2400 may provide the user terminal 1000 with navigation information that includes one or more routes associated with driving and maintenance of the vehicle and POI information. When the operation mode is a walking mode, the navigation information providing unit 2400 may provide the user terminal 1000 with navigation information that includes the routes associated with the user walking and POI information. The navigation information providing unit 2400 may use the information associated with the states of the vehicle to determine the routes and the POI information in a driving mode.

The navigation information providing unit 2400 will be described in more detail with reference to FIG. 3.

The DB 2500 stores information used by the server 2000 to determine a change of the operation mode and generate and provide navigation information according to the changed operation mode. The DB 2500 may store information associated with a criterion for determining an operation mode corresponding to a movement of the user terminal 1000 and information associated with a criterion for generating navigation information according to an operation mode and one or more states of the vehicle.

The transceiving unit 2600 transmits and receives the various pieces of information required by the server 2000 to determine a change of the operation mode and generate and provide the navigation information corresponding to the changed operation mode, to and from the user terminal 1000 and the vehicle management terminal included in the vehicle.

The control unit 2700 controls an overall operation of the server 2000 and controls the movement information reception unit 2100, the operation mode determination unit 2200, the vehicle information collection unit 2300, the navigation information providing unit 2400, the DB 2500, and the transceiving unit 2600 so that the server 2000 determines a change of the operation mode and generates and provides the navigation information corresponding to the changed operation mode.

A detailed structure of the navigation information providing unit 2400 will now be described with reference to FIG. 3.

Figure 3:
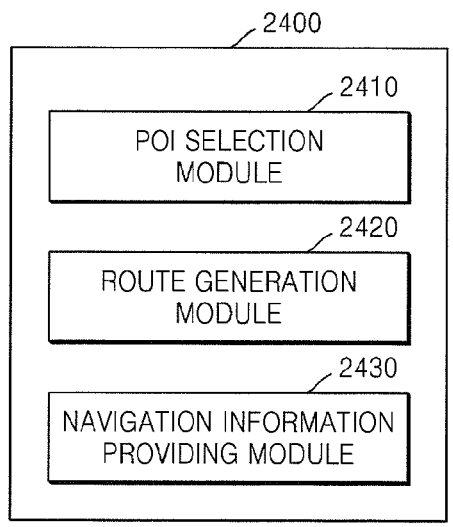
FIG. 3 illustrates an example navigation information providing unit included in the server illustrated in FIG. 2.

FIG. 3 illustrates an example navigation information providing unit 2400 illustrated in FIG. 2.

Referring to FIG. 3, the navigation information providing unit 2400 includes a POI selection module 2410, a route generation module 2420, and a navigation information providing module 2430.

The POI selection module 2410 selects POI information which is to be included in navigation information according to an operation mode. The DB 2500 may store POI information which are to be included in the navigation information, and the POI selection module 2410 may select predetermined POI information from the POI information pieces stored in the DB 2500.

The POI selection module 2410 may select POI information associated with driving of the vehicle, when the operation mode is a driving mode. When the operation mode is a driving mode, the POI selection module 2410 may select POI information by referring to the information associated with the states of the vehicle. For example, when the operation mode is a driving mode and fuel quantity of the vehicle is less than or equal to a preset critical value, the POI selection module 2410 may select POI information associated with a gas station so that the POI information is included in the navigation information.

The POI selection module 2410 may also select POI information associated with a user who is walking when the operation mode is a walking mode. For example, the POI selection module 2410 may select POI information associated with a convenience store, a department store, and the like so that the POI information is included in the navigation information, when the operation mode is a walking mode.

The route generation module 2420 generates a route toward a destination based on the operation mode. The DB 2500 may store different set values for route generation according to different operation modes, and the route generation module 2420 may generate routes toward a destination according to the set values stored in the DB 2500.

The route generation module 2420 may generate routes associated with driving of the vehicle, when the operation mode is a driving mode. For example, the route generation module 2420 may generate routes preferentially including driveways and roads with many lanes, when the operation mode is a driving mode.

The route generation module 2420 may generate routes by referring to the information associated with the states of the vehicle, when the operation mode is a driving mode. For example, when the operation mode is a driving mode and the mileage of the vehicle is equal to or greater than a preset critical value, the route generation module 2420 may generate a route preferentially including roads having auto repair shops.

The route generation module 2420 may generate routes associated with the user walking, when the operation mode is a walking mode. For example, the route generation module 2420 may generate routes including alleys to allow the user to arrive at the destination via the most direct route, when the operation mode is a walking mode.

The navigation information providing module 2430 provides navigation information according to an operation mode to the user terminal 1000. The navigation information providing module 2430 may provide route information and POI information according to an operation mode to the user terminal 1000. The navigation information providing module 2430 may monitor a change of the operation mode. When the operation mode changes, the navigation information providing module 2430 may provide route information and POI information corresponding to the changed operation mode to the user terminal 1000 in real time.

The user terminal 1000 will now be described in greater detail with reference to FIG. 4.

Figure 4:
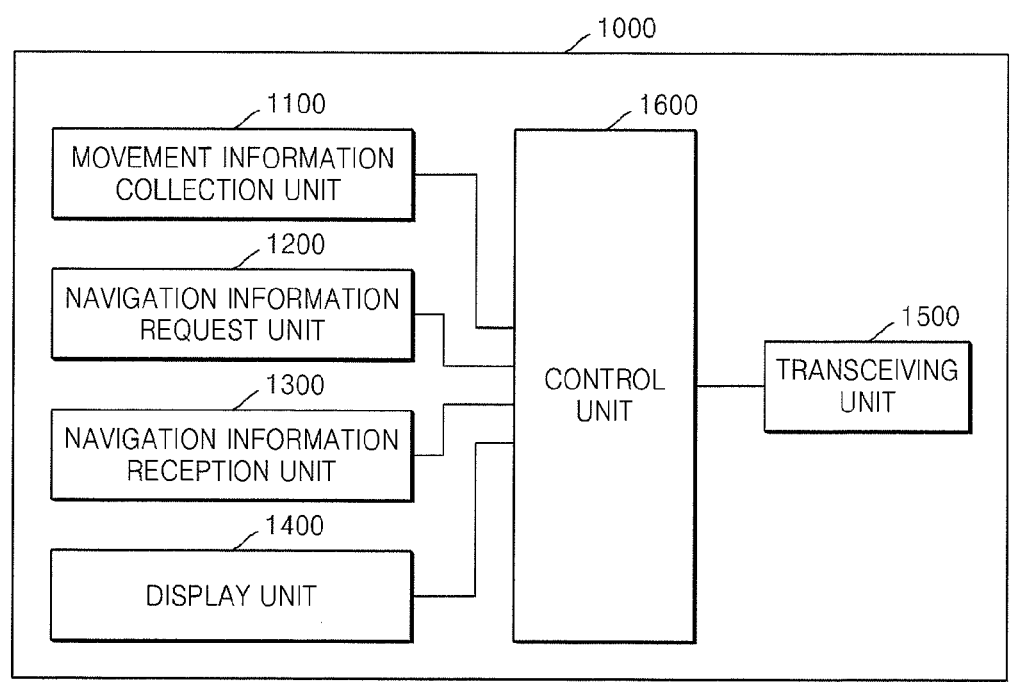
FIG. 4 illustrates an example user terminal included in the navigation information providing system illustrated in FIG. 1.

FIG. 4 illustrates an example user terminal 1000 of FIG. 1.

Referring to FIG. 4, the user terminal 1000 includes a movement information collection unit 1100, a navigation information request unit 1200, a navigation information reception unit 1300, a display unit 1400, a transceiving unit 1500, and a control unit 1600.

The movement information collection unit 1100 collects the information associated with the movement of the user terminal 1000. The movement information collection unit 1100 may collect information associated with a location and a movement of the user terminal 1100, by using, for example, a global positioning system (GPS) sensor or an acceleration sensor.

The movement information collection unit 1100 may acquire information associated with a moving speed and a change of the moving speed. In detail, the movement information collection unit 1100 may calculate a moving speed of the user terminal 1000, based on a moving distance and a moving time of the user terminal 1000. The movement information collection unit 1100 may acquire information associated with the degree to which the moving speed increases or decreases and information associated with a period of time during which the moving speed is maintained within a predetermined range.

The movement information collection unit 1100 may collect information associated with a motion of the user terminal 1000 as the movement information of the user terminal 1000 using acceleration sensor data. For example, the movement information collection unit 1100 may collect information associated with the degree to which the user terminal 1000 is shaken.

The navigation information request unit 1200 requests the server 2000 for the navigation information. The navigation information request unit 1200 may provide the server 2000 with a starting point, a destination, and information associated with a movement of the user terminal 1000. The navigation information request unit 1200 may also provide the information associated with the states of the vehicle received from the vehicle management terminal included in the vehicle to the server 2000.

The navigation information reception unit 1300 receives navigation information corresponding to the operation mode from the server 2000. The navigation information reception unit 1300 may receive navigation information that differs according to the driving mode and the walking mode. When the operation mode changes, the navigation information reception unit 1300 may also receive navigation information associated with the changed operation mode. The operation mode may be changed according to a movement pattern of the user terminal 1000, and the navigation information reception unit 1300 may receive navigation information corresponding to the changed operation mode in real time.

The display unit 1400 displays the received navigation information. When the operation mode is changed according to the movement pattern of the user terminal 1000, the display unit 1400 may convert and display the navigation information corresponding to the changed operation mode in real time.

The transceiving unit 1500 transmits and receives various pieces of information, which are required by the user terminal 1000 to collect the movement information and receive the navigation information from the server 2000, to and from the server 2000 and the vehicle management terminal included in the vehicle.

The control unit 1600 controls an overall operation of the user terminal 1000, such as the movement information collection unit 1100, the navigation information request unit 1200, the navigation information reception unit 1300, the display unit 1400, and the transceiving unit 1500 so that the user terminal 1000 collects the movement information and receives the navigation information corresponding to the operation mode of the user terminal 1000.

A navigation information providing method according to an embodiment of the present invention will now be described with reference to FIG. 5.

Figure 5:
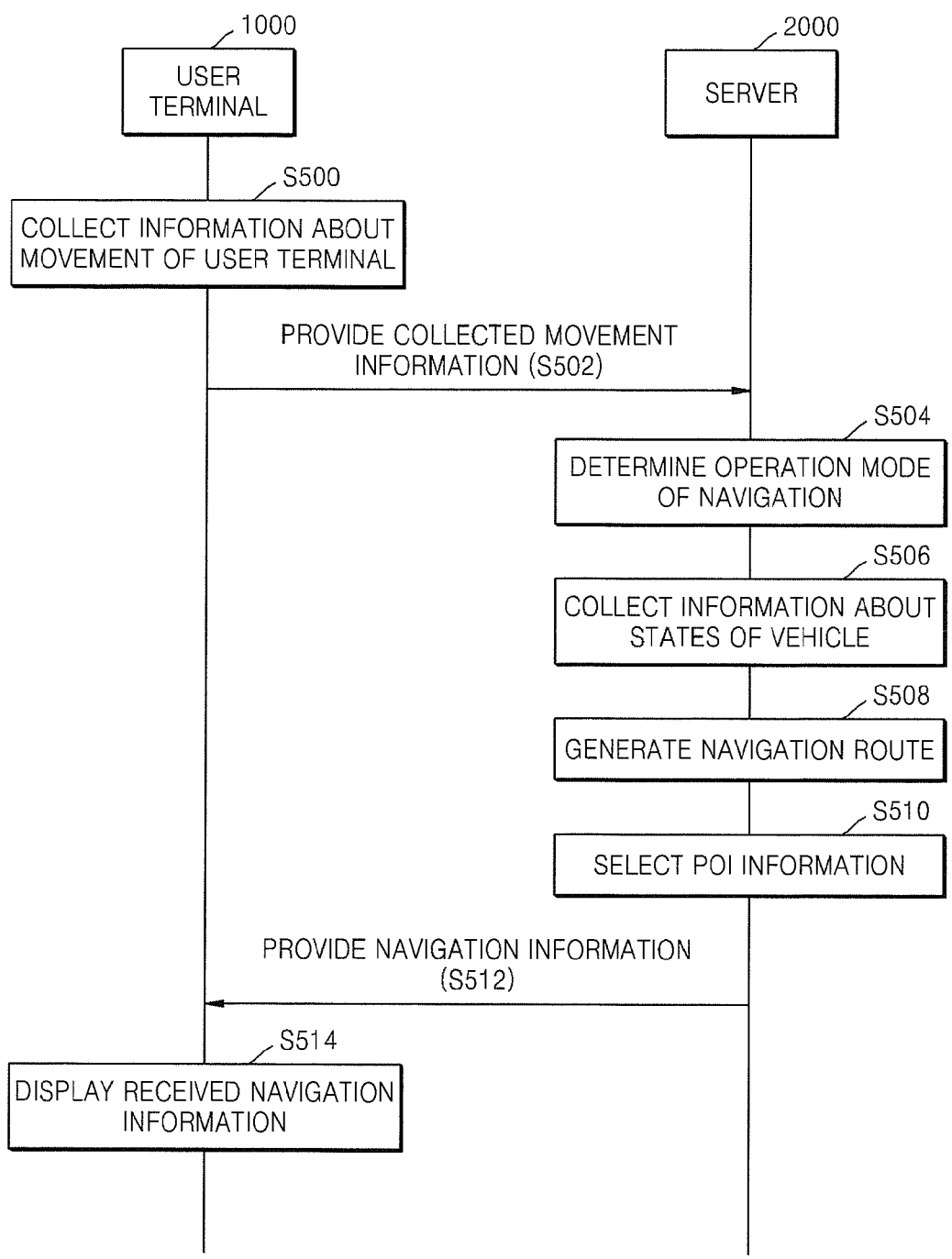
FIG. 5 illustrates an example navigation information providing method according to an embodiment of the present invention.

FIG. 5 illustrates an example navigation information providing method according to an embodiment of the present invention.

In operation S500, the user terminal 1000 collects information associated with a movement of the user terminal 1000. In operation S500, the user terminal 1000 may collect information associated with a location and a movement of the user terminal 1000, by using, for example, a GPS sensor or an acceleration sensor. The user terminal 1000 may acquire information associated with a moving speed and a change of the moving speed. Specifically, the user terminal 1000 may calculate a moving speed of the user terminal 1000 based on a moving distance and a moving time of the user terminal 1000. The user terminal 1000 may acquire information associated with the degree to which the moving speed increases or decreases and information associated with a period of time during which the moving speed is maintained within a predetermined range.

In operation S502, the user terminal 1000 provides the collected movement information to the server 2000.

In operation S504, the server 2000 determines an operation mode of navigation. In operation S504, the server 2000 may determine an operation mode of navigation, based on the received movement information. The server 2000 may analyze a movement pattern of the user terminal 1000 based on the moving speed of the user terminal 1000 and the period of time during which a moving speed is maintained, and may determine the operation mode of navigation according to the movement pattern of the user terminal 1000. The operation mode of navigation is a driving mode associated with vehicle driving or a walking mode associated with a user walking, but examples of the operation mode of navigation are not limited thereto.

For example, in operation S504, the server 2000 may determine the operation mode to be a driving mode, when the moving speed of the user terminal 1000 is approximately 20 km/h or higher. For example, the server 2000 may also determine the operation mode to be a driving mode when an increase and a decrease of the moving speed of the user terminal 1000 are continually in the range of 0 km/h to 10 km/h. For example, the server 2000 may determine the operation mode to be a walking mode, when a moving speed of 3 km/h to 5 km/h is maintained for a predetermined period of time or more.

In operation S506, the server 2000 collects information associated with states of the vehicle. In operation S506, the server 2000 may collect, for example, information associated with fuel quantity of the vehicle, information associated with mileage of the vehicle, and information associated with whether a device included in the vehicle malfunctions.

The server 2000 may receive the information associated with the states of the vehicle from a vehicle management terminal (not shown) included in the vehicle. In this case, the server 2000 may receive information associated with connecting to the vehicle management terminal from the user terminal 1000 and may request the vehicle management terminal for the information associated with the states of the vehicle by using the received information.

Alternatively, the server 2000 may collect the information associated with the states of the vehicle from the user terminal 1000. In this case, the user terminal 1000 may receive the information associated with the states of the vehicle from the vehicle management terminal and provide the same to the server 2000.

In operation S508, the server 2000 generates a navigation route. In operation S508, the server 2000 generates a route to a destination based on the operation mode. The DB 2500 may store different set values for route generation according to different operation modes, and the server 2000 may generate routes toward a destination according to the set values stored in the DB 2500.

The server 2000 may generate a route associated with driving of the vehicle, when the operation mode is a driving mode. In certain embodiments, the server 2000 may generate a route preferentially including driveways and roads with many lanes, when the operation mode is a driving mode.

The server 2000 may generate a route by referring to the information associated with the states of the vehicle, when the operation mode is a driving mode. For example, when the operation mode is a driving mode and mileage of the vehicle is equal to or greater than a preset critical value, the server 2000 may generate a route preferentially including roads in which auto repair shops are located.

The server 2000 may generate a route associated with a user who is walking when the operation mode is a walking mode. For example, the server 2000 may generate a route including one or more alleys to provide the user with information for arriving at the destination via the most direct route when the operation mode is a walking mode.

In operation S510, the server 2000 selects POI information. In operation S510, the server 2000 selects POI information which is to be included in navigation information, according to the operation mode. The DB 2500 may store POI information that are to be included in the navigation information, and the server 2000 may select predetermined POI information from the POI information stored in the DB 2500.

The server 2000 may select POI information associated with driving of the vehicle when the operation mode is a driving mode. The server 2000 may select POI information by referring to the information associated with the states of the vehicle, when the operation mode is a driving mode. For example, when the operation mode is a driving mode and fuel quantity of the vehicle is less than or equal to a preset critical value, the server 2000 may select POI information associated with a gas station so that the POI information is included in the navigation information.

The server 2000 may select POI information associated with a user walking, when the operation mode is a walking mode. For example, the server 2000 may select POI information associated with a convenience store, a department store, and the like, when the operation mode is a walking mode.

In operation S512, the server 2000 provides the navigation information to the user terminal 1000. In operation S512, the server 2000 provides navigation information according to the operation mode to the user terminal 1000. The server 2000 may provide route information and POI information according to an operation mode to the user terminal 1000. When the operation mode changes, the server 2000 may provide route information and POI information corresponding to the changed operation mode to the user terminal 1000 in real time.

In operation S514, the user terminal 1000 displays the received navigation information. When the operation mode changes according to a movement pattern of the user terminal 1000, the user terminal 1000 may convert and display navigation information corresponding to the changed operation mode in real time.

Change and display of navigation information according to a change of an operation mode according to an embodiment of the present invention will now be described with reference to FIGS. 6 and 7.

Figure 6:
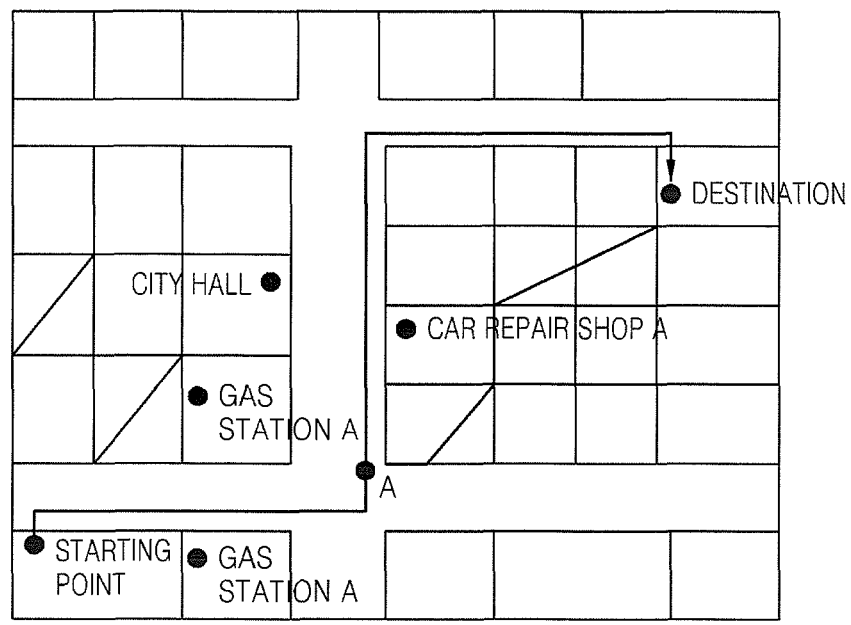
FIG. 6 illustrates an example of displaying navigation information in a driving mode, according to an embodiment of the present invention.

FIG. 6 illustrates an example of displaying navigation information in a driving mode, according to an embodiment of the present invention. FIG. 7 illustrates an example of displaying navigation information in a walking mode, according to an embodiment of the present invention.

Referring to FIG. 6, a route from a starting point to a destination may be displayed according to a road in a driving mode, and a route based on roads with gas stations or car repair shops may be displayed according to a state of the vehicle. POI information associated with gas stations and car repair shops, for example, may be displayed along a route.

When a user gets out of a vehicle at a location 'A' of FIG. 6 and moves on foot, the server 2000 may determine that the operation mode has been changed to a walking mode and may provide navigation information corresponding to the walking mode to the user terminal 1000.

Figure 7:
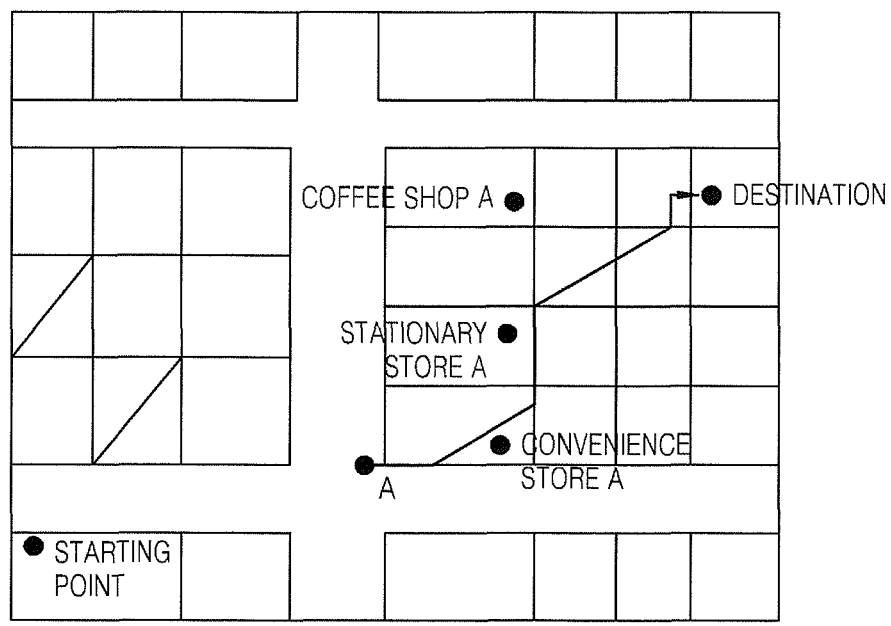
FIG. 7 illustrates an example of displaying navigation information in a walking mode, according to an embodiment of the present invention.

Accordingly, the user terminal 1000 may display navigation information corresponding to the walking mode, as shown in FIG. 7. In the walking mode, alleys that may be used along a route to the destination may be marked, and POIs such as a convenience store, a department store, and a coffee shop that the user can use while walking may be marked along the route.

A criterion for generating navigation information according to an embodiment of the present invention will now be described with reference to FIG. 8.

FIG. 8 illustrates an example of a criterion on which navigation information is generated according to an operation mode, according to an embodiment of the present invention.

Referring to FIG. 8, the DB 2500 may store a setting table for generating navigation information, and the setting table may include an operation mode field 10, a POI field 12, and a route field 14.

The operation mode field 10 stores the values of operation modes determined according to movements of the user terminal 1000. The operation mode field 10 may store, for example, a driving mode and a walking mode.

The POI field 12 may store information associated with POIs which will be preferentially selected when navigation information is generated. For example, when the operation mode is a driving mode, the POI field 12 may store POI values so that POIs such as a landmark, a gas station, and a car repair shop are preferentially selected. For example, when the operation mode is the walking mode, the POI field 12 may store POI values so that POIs such as a convenience store, a department store, and a coffee shop are preferentially selected.

The route field 14 may store information associated with routes which will be preferentially considered when navigation information is generated. For example, when the operation mode is a driving mode, the route field 14 may store route values so that driveways and main roads are preferentially considered when a route is generated. For example, when the operation mode is a walking mode, the route field 14 may store route values so that alleys are preferentially considered when a route is generated.

A criterion on which POI information is selected in a driving mode according to states of a vehicle, according to an embodiment of the present invention, will now be described with reference to FIG. 9.

FIG. 9 illustrates an example of a criterion on which POI information is selected in a driving mode according to states of a vehicle, according to an embodiment of the present invention.

Referring to FIG. 9, the DB 2500 may store a setting table for selecting POI information in a driving mode, and the setting table may include a fuel quantity field 20, a mileage field 22, and a POI field 24.

The fuel quantity field 20 may store the fuel quantities of a vehicle, and the mileage field 22 may store the mileages of the vehicle. The POI field 24 may store values of POIs which are to be preferentially selected according to the fuel quantities and the mileages. For example, when fuel quantity is 'LOW' and mileage is '100,000 km', the POI field 24 may store values so that a POI such as a gas station is preferentially selected. For example, when fuel quantity is 'HIGH' and mileage is '115,000 km', the POI field 24 may store POI values so that a POI such as a car repair shop is preferentially selected. For example, when fuel quantity is 'LOW' and mileage is '115,000 km', the POI field 24 may store POI values so that POIs such as a gas station and a car repair shop are preferentially selected.

A navigation information providing system according to another embodiment of the present invention will now be described with reference to FIG. 10.

Figure 10:
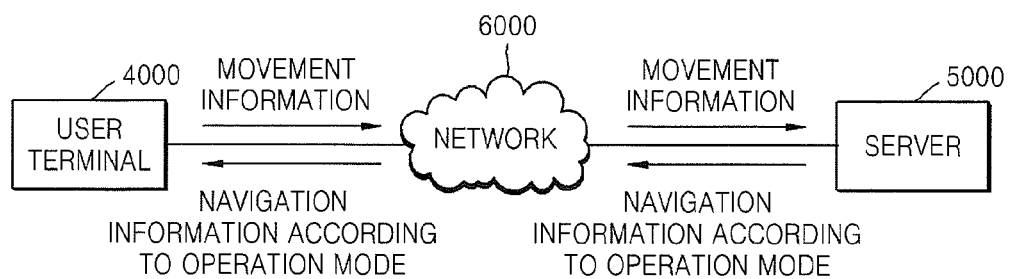
FIG. 10 illustrates an example a navigation information providing system according to another embodiment of the present invention.

FIG. 10 illustrates an example navigation information providing system according to another embodiment of the present invention.

Referring to FIG. 10, in the navigation information providing system, a user terminal 4000 is connected to a server 5000 via a network 6000, and provides information associated with an operation mode of navigation to the server 5000 and receives and displays navigation information from the server 5000.

The user terminal 4000 may collect information associated with a movement of the user terminal 4000, may determine an operation mode by using the collected information, and may provide information associated with the determined operation mode to the server 5000. The server 5000 may generate and provide navigation information corresponding to the operation mode to the user terminal 4000. When the operation mode changes, the server 5000 may provide navigation information corresponding to the changed operation mode to the user terminal 4000 in real time.

The server 5000 will now be described in greater detail with reference to FIG. 11.

Figure 11:
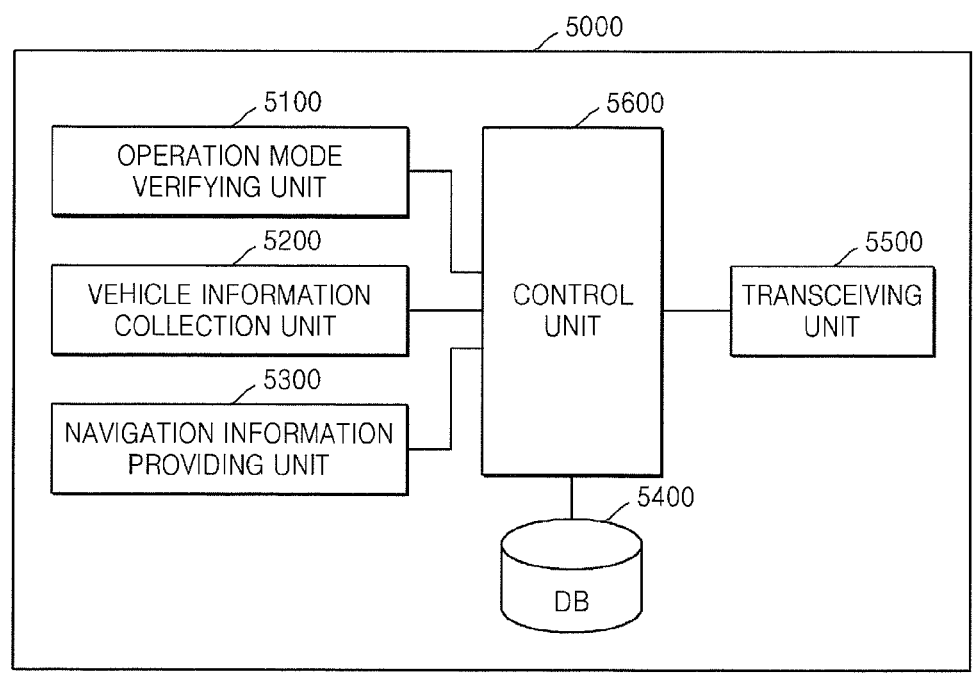
FIG. 11 illustrates an example server included in the navigation information providing system illustrated in FIG. 10.

FIG. 11 illustrates an example server 5000 of FIG. 11.

Referring to FIG. 11, the server 5000 includes an operation mode verifying unit 5100, a vehicle information collection unit 5200, a navigation information providing unit 5300, a DB 5400, a transceiving unit 5500, and a control unit 5600. The vehicle information collection unit 5200 and the navigation information providing unit 5300 of the server 5000 perform similar functions to the vehicle information collection unit 2300 and the navigation information providing unit 2400 of the server 2000, respectively, so descriptions thereof will be omitted for convenience.

The operation mode verifying unit 5100 receives information associated with an operation mode of navigation from the user terminal 4000 and verifies the operation mode and a change of the operation mode. The operation mode verifying unit 5100 may receive, for example, information associated with a driving mode and a walking mode, from the user terminal 4000. When the operation mode represented by the information received from the user terminal 4000 is different from a current operation mode, the operation mode verifying unit 5100 may verify that the operation mode has been changed. The operation mode verified by the operation mode verifying unit 5100 may be used by the navigation information providing unit 5300 to generate navigation information.

The user terminal 4000 will now be described in greater detail with reference to FIG. 12.

Figure 12:
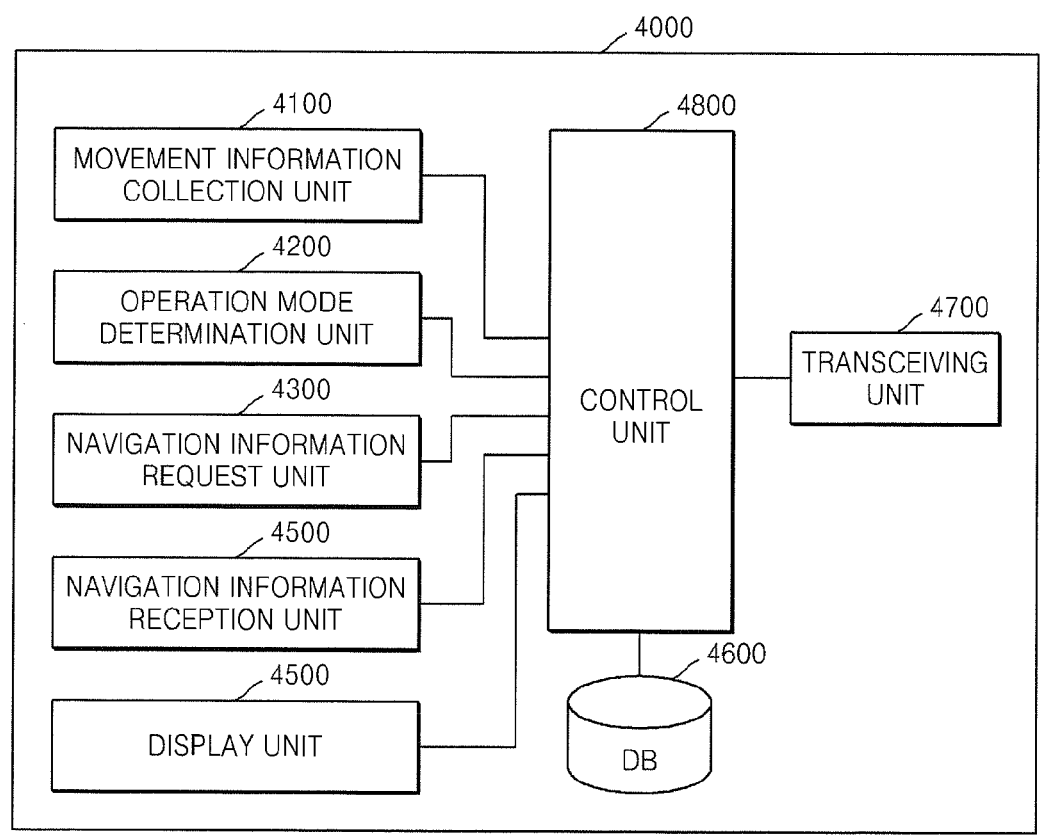
FIG. 12 illustrates an example user terminal included in the navigation information providing system illustrated in FIG. 10.

FIG. 12 illustrates an example user terminal 4000 of FIG. 10.

Referring to FIG. 12, the user terminal 4000 may include a movement information collection unit 4100, an operation mode determination unit 4200, a navigation information request unit 4300, a navigation information reception unit 4400, a display unit 4500, a DB 4600, a transceiving unit 4700, and a control unit 4800.

The movement information collection unit 4100, the navigation information request unit 4300, the navigation information reception unit 4400, and the display unit 4500 of the user terminal 4000 perform similar functions to the movement information collection unit 1100, the navigation information request unit 1200, the navigation information reception unit 1300, and the display unit 1400 of the user terminal 1000, respectively, so descriptions thereof will be omitted for convenience.

The operation mode determination unit 4200 determines an operation mode of navigation based on collected movement information. The operation mode determination unit 4200 may analyze a movement pattern of the user terminal 4000 based on the moving speed of the user terminal 4000 and a period of time during which a moving speed is maintained, and may determine the operation mode of navigation according to the analyzed movement pattern of the user terminal 4000. The operation mode of navigation is a driving mode associated with vehicle driving or a walking mode associated with a user walking, but examples of the operation mode of navigation are not limited thereto.

For example, the operation mode determination unit 4200 may determine the operation mode to be a driving mode, when the moving speed of the user terminal 4000 is approximately 20 km/h or more. For example, the operation mode determination unit 4200 may also determine the operation mode to be a driving mode, when an increase and a decrease of the moving speed of the user terminal 4000 are continually in the range of 0 km/h to 10 km/h. For example, the operation mode determination unit 4200 may determine the operation mode to be a walking mode, when a moving speed of 3 km/h to 5 km/h is maintained for a predetermined period of time or more.

The operation mode determined by the operation mode determination unit 4200 may be provided to the server 5000 when the navigation information request unit 4300 requests navigation information from the server 5000.

The DB 4600 stores information used by the user terminal 4000 to determine the operation mode. The DB 4600 may store information associated with a criterion for determining an operation mode corresponding to a movement of the user terminal 4000 and information associated with the operation mode.

A navigation information providing method according to another embodiment of the present invention will now be described with reference to FIG. 13.

Figure 13:
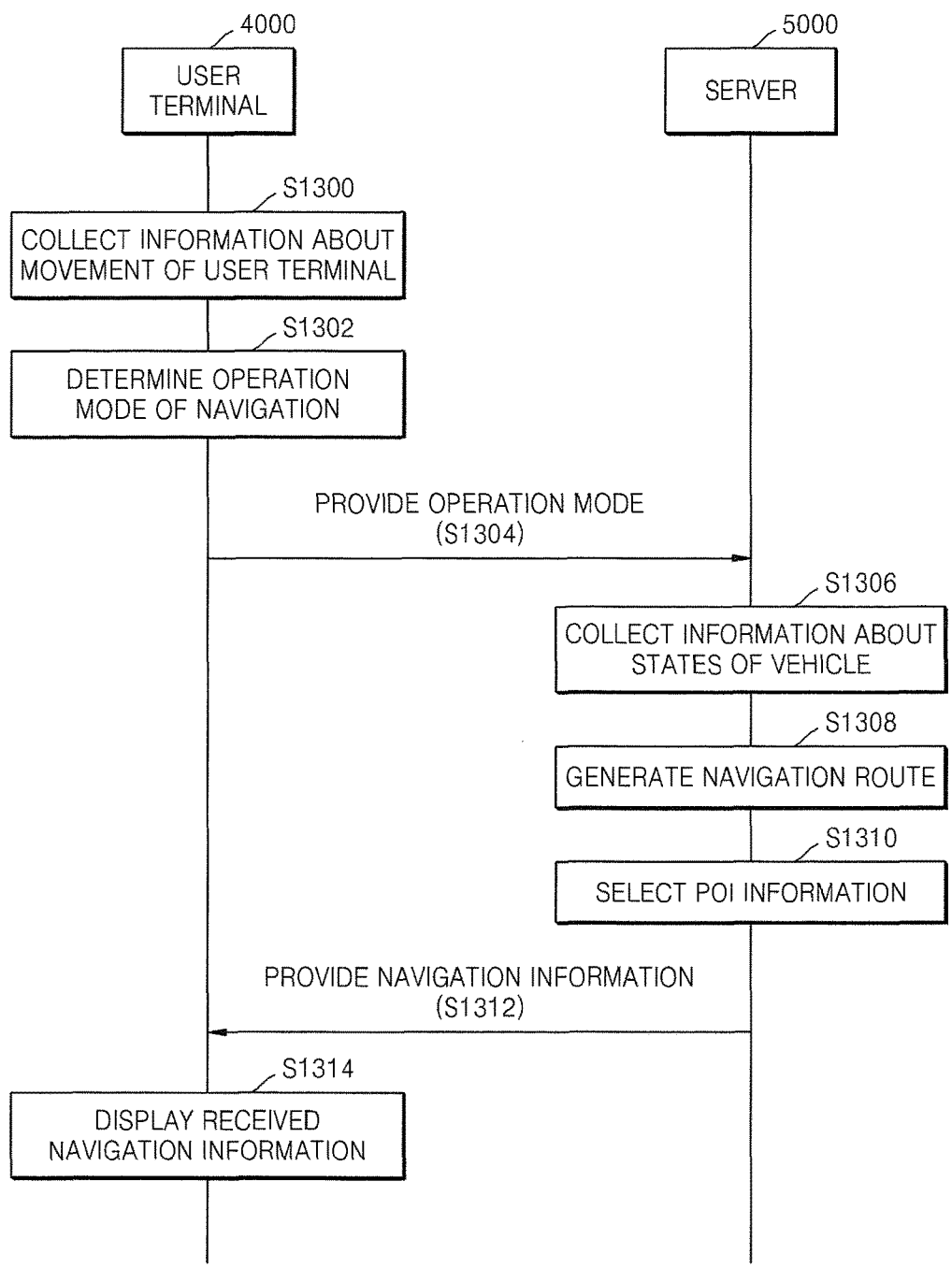
FIG. 13 illustrates an example navigation information providing method according to another embodiment of the present invention.

FIG. 13 illustrates an example navigation information providing method according to another embodiment of the present invention.

In operation S1300, the user terminal 4000 collects movement information of the user terminal 4000. In operation S1300, the user terminal 4000 may collect information associated with a location and a movement of the user terminal 1000, by using, for example, a GPS sensor or an acceleration sensor. The user terminal 4000 may acquire information associated with a moving speed and a change of the moving speed. Specifically, the user terminal 4000 may calculate a moving speed of the user terminal 4000 based on a moving distance and a moving time of the user terminal 4000. The user terminal 4000 may acquire information associated with the degree to which the moving speed increases or decreases and information associated with a period of time during which the moving speed is maintained within a predetermined range.

In operation S1302, the user terminal 4000 determines an operation mode of navigation. In operation S1302, the user terminal 4000 may determine the operation mode of navigation based on the collected movement information. The user terminal 4000 may analyze a movement pattern of the user terminal 4000 based on the moving speed of the user terminal 4000 and the period of time during which a moving speed is maintained, and may determine the operation mode of navigation according to the movement pattern of the user terminal 4000. The operation mode of navigation is a driving mode associated with vehicle driving or a walking mode associated with a user walking, but examples of the operation mode of navigation are not limited thereto.

For example, in operation S1302, the user terminal 4000 may determine the operation mode to be a driving mode, when the moving speed of the user terminal 4000 is approximately 20 km/h or higher. For example, the user terminal 4000 may also determine the operation mode to be a driving mode, when an increase and a decrease of the moving speed of the user terminal 4000 are continually in the range of 0 km/h to 10 km/h. For example, the user terminal 4000 may determine the operation mode to be a walking mode, when a moving speed of 3 km/h to 5 km/h is maintained for a predetermined period of time or more.

In operation S1304, the user terminal 4000 provides information associated with the determined operation mode to the server 5000.

Subsequent operations S1306-S1314 are similar to operations S506-S514 of FIG. 5, respectively, so detailed descriptions thereof will be omitted for convenience.

The user terminal 7000 will now be described in greater detail with reference to FIG. 14.

Figure 14:
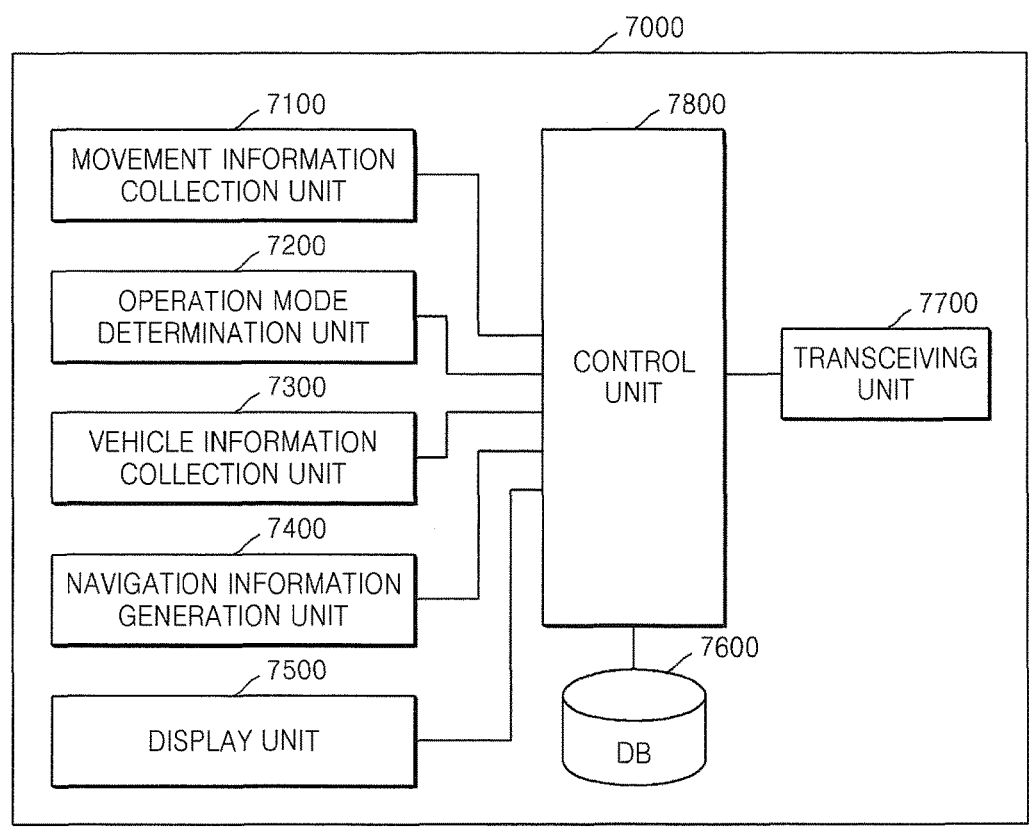
FIG. 14 illustrates an example user terminal according to another embodiment of the present invention.

FIG. 14 illustrates an example user terminal 7000 according to another embodiment of the present invention.

Referring to FIG. 14, the user terminal 7000 may be provided with navigation information according to an operation mode by a server (not shown).

The movement information collection unit 7100, the operation mode determination unit 7200, and the display unit 7500 of the user terminal 7000 may perform similar functions to the movement information collection unit 4100, the operation mode determination unit 4200, and the display unit 4500 of the user terminal 4000 of FIG. 10, respectively. The vehicle information collection unit 7300 and the navigation information generation unit 7400 of the user terminal 7000 may perform similar functions to the vehicle information collection unit 5200 and the navigation information providing unit 5300 of the server 5000 of FIG. 10, respectively.

A navigation information providing method according to another embodiment of the present invention will now be described with reference to FIG. 15.

Figure 15:
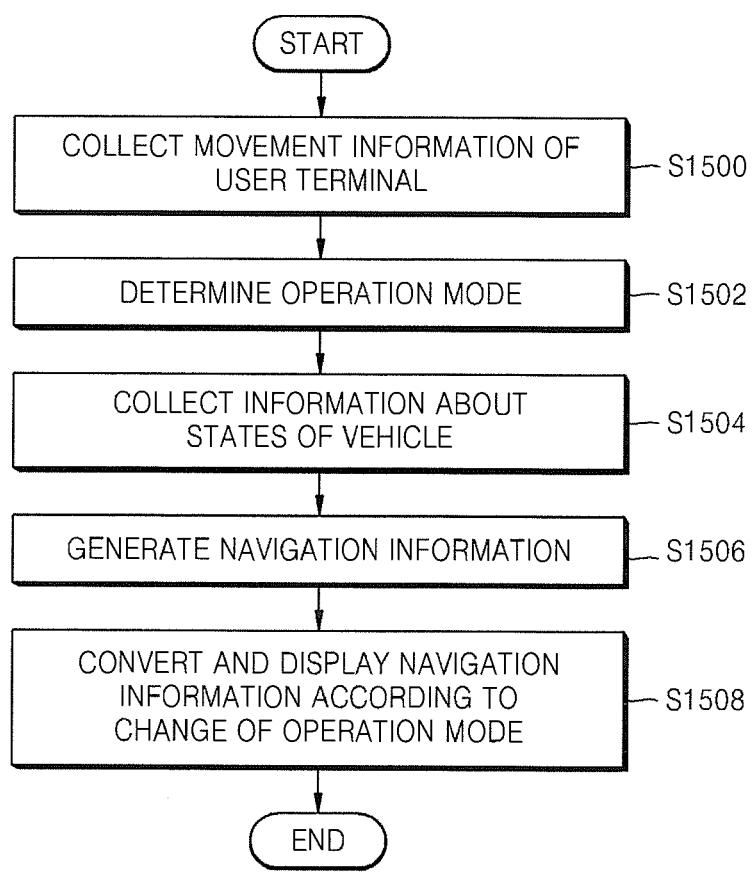
FIG. 15 illustrates an example navigation information providing method according to another embodiment of the present invention.

FIG. 15 illustrates an example navigation information providing method according to another embodiment of the present invention.

Referring to FIG. 15, in the navigation information providing method, the user terminal 7000 may collect movement information of the user terminal 7000, in operation S1500. In operation S1502, the user terminal 7000 may determine an operation mode according to the movement information. In operation S1504, the user terminal 7000 may collect information associated with one or more states of a vehicle. In operation S1506, the user terminal 7000 may generate navigation information based on the determined operation mode and the information associated with the states of the vehicle. In operation S1508, the user terminal 7000 may convert and display navigation information according to a change of the operation mode.

According to the above-described embodiments of the present invention, differentiated navigation information may be provided according to operation modes of navigation.

According to the above-described embodiments of the present invention, navigation information that includes different POIs and different routes according to a change of a navigation operation mode may be converted and provided.

According to the above-described embodiments of the present invention, navigation information may be provided based on operation modes of navigation and the states of a vehicle.

The embodiment of the present invention can be embodied in a non-transitory storage medium including instruction codes executable by a computer such as a program module executed by the computer. A computer readable medium can be any usable medium which can be accessed by the computer and includes all volatile/non-volatile and removable/non-removable media. Furthermore, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanisms, and includes any information transmission medium.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server capable of providing navigation information, comprising:
a communication unit configured to receive information associated with a movement of a user terminal;
a control unit configured to:
switch an operation mode between a plurality of operation modes comprising a driving mode and a walking mode based on the received information associated with the movement of the user terminal;
obtain information associated with whether a device included in a vehicle malfunctions;
change navigation information according to the switch of the operation mode based on the information associated with whether a device included in the vehicle malfunctions, the navigation information including Point of Interest (POI) information and information associated with a route; and
provide the changed navigation information to the user terminal,
wherein POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type having the selected POI is selected from among a plurality of road types based on the operation mode such that a first subset of road types are preferentially selected in the driving mode and a second subset of road types are preferentially selected in the walking mode.

2. The server of claim 1, wherein the control unit is configured to identify a change of a moving speed of the user terminal based on the information associated with the movement of the user terminal and switch, based on the change of the moving speed, an operation mode between a plurality of operation modes comprising a driving mode and a walking mode.

3. The server of claim 1, wherein, when the operation mode is switched, the control unit is configured to provide navigation information corresponding to the switched operation mode to the user terminal.

4. The server of claim 1, wherein
the predetermined POI field includes location associated with vehicle driving, when the operation mode is the driving mode.

5. The server of claim 1, wherein
the predetermined POI field excludes location associated with vehicle driving, when the operation mode is the walking mode.

6. The server of claim 1, wherein:
vehicle information comprises at least one of information associated with fuel quantity of the vehicle and information associated with mileage of the vehicle, and
the POI information is associated with at least one of a gas station and a car repair shop.

7. A server capable of providing navigation information, comprising:
a communication unit configured to receive an operation mode of navigation from a user terminal, wherein the operation mode is switched between a plurality of operation modes comprising a driving mode and a walking mode based on a movement pattern of the user terminal; and
a control unit configured to:
obtain information associated with whether a device included in a vehicle malfunctions, and
provide the user terminal with navigation information corresponding to the switched operation mode based on the information associated with whether a deice included in the vehicle malfunctions, the navigation information including Point of Interest(POI) information and information associated with a route,
wherein the POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

8. The server of claim 7, wherein the movement pattern of the user terminal comprises a change of a moving speed of the user terminal.

9. The server of claim 7, wherein the predetermined POI field includes location associated with vehicle driving, when the operation mode is the driving mode.

10. The server of claim 7, wherein
the predetermined POI field excludes location associated with vehicle driving, when the operation mode is the walking mode.

11. A user terminal capable of providing navigation information based on an operation mode, the user terminal comprising:
a sensor unit configured to collect information associated with a movement of the user terminal;
a communication unit configured to provide the collected information to a server, wherein the collected information is used to switch the operation mode of navigation between a plurality of operation modes comprising a driving mode and a walking mode;
a control unit configured to:
obtain information associated with whether a device included in a vehicle malfunctions, and
receive navigation information corresponding to the switched operation mode of navigation based on the information associated with whether a device included in the vehicle malfunctions from the server, the navigation information including Point of Interest (POI) information and information associated with a route; and
a display unit configured to display the received navigation information,
wherein the POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

12. The user terminal of claim 11, wherein the operation mode of navigation is configured to be determined by the server based on a change of a moving speed of the user terminal.

13. The user terminal of claim 11, wherein the received navigation information is configured to be generated by the server based on the POI information.

14. A user terminal capable of providing navigation information based on an operation mode, the user terminal comprising:
  a sensor unit configured to collect information associated with a movement of a user terminal, wherein the collected information is used to switch the operation mode of navigation between a plurality of operation modes comprising a driving mode and a walking mode;
  a control unit configured to determine to switch the operation mode of navigation based on the information associated with the movement of the user terminal;
  a communication unit configured to:
    transmit information associated with whether a device included in a vehicle malfunctions,
    request a server for navigation information corresponding to the switched operation mode, and
    receive navigation information corresponding to the switched operation mode from the server based on the information associated with whether a device included in the vehicle malfunctions, the navigation information including Point of Interest (POI) information and information associated with a route; and
  a display unit configured to display the received navigation information,
  wherein the POI information is provided based on a predetermined POI field that differs according to the operation mode, and a POI is selected from among a plurality of POIs based on a predetermined condition, and
  wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

15. The user terminal of claim 14, wherein the control unit is configured to switch the operation mode based on a change of a moving speed of the user terminal.

16. The user terminal of claim 14, wherein the received navigation information is configured to be generated by the server based on the POI information.

17. A user terminal capable of providing navigation information based on an operation mode, the user terminal comprising:
  a sensor unit configured to collect information associated with a movement of a user terminal, wherein the collected information is used to switch the operation mode of navigation between a plurality of operation modes comprising a driving mode and a walking mode;
  a control unit configured to:
    obtain information associated with whether a device included in a vehicle malfunctions,
    determine to switch the operation mode of navigation based on the information associated with the movement of the user terminal, and
    generate navigation information corresponding to the switched operation mode based on the information associated with whether a device included in the vehicle malfunctions, the navigation information including Point of Interest (POI) information and information associated with a route; and
  a display unit configured to display the generated navigation information,
  wherein the POI information is provided based on a predetermined POI field that differs according to the operation mode, and a POI is selected from among a plurality of POIs based on a predetermined condition, and
  wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

18. A navigation information providing method comprising:
  receiving information associated with a movement of a user terminal from the user terminal;
  switching an operation mode between a plurality of operation modes comprising a driving mode and a walking mode based on the received information associated with the movement of the user terminal;
  obtaining information associated with whether a device included in a vehicle malfunctions;
  changing navigation information according to the switch of the operation mode based on the information associated with whether a device included in the vehicle malfunctions; and
  providing the changed navigation information to the user terminal, the navigation information including Point of Interest (POI) information and information associated with a route,
  wherein the POI information is provided based on a predetermined POI field that differs according to the operation mode, and a POI is selected from among a plurality of POIs based on a predetermined condition, and
  wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

19. A navigation information providing method comprising:
  receiving, from a user terminal, an operation mode of navigation, wherein the operation mode is switched between a plurality of operation modes comprising a driving mode and a walking mode, based on a movement pattern of the user terminal;
  obtaining information associated with whether a device included in a vehicle malfunctions; and
  providing the user terminal with navigation information corresponding to the switched operation mode based on the information associated with whether a device included in the vehicle malfunctions, the navigation information including Point of Interest (POI) information and information associated with a route,
wherein the POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

20. A method for receiving navigation information, the method comprising:
collecting information associated with a movement of a user terminal and providing the collected movement information to a server, wherein the collected information is used to switch the operation mode of navigation between a plurality of operation modes comprising a driving mode and a walking mode;
obtaining information associated with whether a device included in a vehicle malfunctions and transmitting the information associated with whether a device included in the vehicle malfunctions to the server; and
receiving navigation information corresponding to a switched operation mode of navigation based on the information associated with whether a device included in the vehicle malfunctions from the server, the navigation information including Point of Interest (POI) information and information associated with a route; and
displaying the received navigation information,
wherein the POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

21. A method for receiving navigation information based on an operation mode, the method comprising:
collecting information associated with a movement of a user terminal;
switching an operation mode between a plurality of operation modes comprising a driving mode and a walking mode based on the information associated with the movement of the user terminal;
obtaining information associated with whether a device included in a vehicle malfunctions and transmitting the information associated with whether a device included in the vehicle malfunctions to a server;
requesting the server for navigation information corresponding to the switched operation mode;
receiving navigation information corresponding to the switched operation mode based on the information associated with whether a device included in the vehicle malfunctions from the server, the navigation information including Point of Interest (POI) information and information associated with a route; and
displaying the received navigation information,
wherein the received navigation information includes POI information which is provided based on a predetermined POI field that differs according to the operation mode, and a road type of a road having a selected POI, the road type selected from among a plurality of road types based on the operation mode such that a first subset of road types are preferentially selected in the driving mode and a second subset of road types are preferentially selected in the walking mode.

22. A method for providing navigation information based on an operation mode, the method comprising:
collecting information associated with a movement of a user terminal;
switching an operation mode between a plurality of operation modes comprising a driving mode and a walking mode based on the information associated with the movement of the user terminal;
obtaining information associated with whether a device included in a vehicle malfunctions;
generating navigation information corresponding to the switched operation mode based on the information associated with whether a device included in the vehicle malfunction, the navigation information including Point of Interest (POI) information and information associated with a route; and
displaying the generated navigation information,
wherein the POI information is provided based on a predetermined POI field that differs according to the operation mode, and a POI is selected from among a plurality of POIs based on a predetermined condition, and
wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

23. A non-transitory computer readable recording medium storing computer-readable instructions that, when executed by a processor, cause the processor to:
collect information associated with a movement of a user terminal and providing the collected movement information to a server, wherein the collected information is used to switch the operation mode of navigation between a plurality of operation modes comprising a driving mode and a walking mode;
obtain information associated with whether a device included in a vehicle malfunctions and transmit the information associated with whether a device included in the vehicle malfunctions to the server;
receive navigation information corresponding to a switched operation mode of navigation based on the information associated with whether a device included in the vehicle malfunctions from the server, the navigation information including Point of Interest (POI) information and information associated with a route; and
display the received navigation information corresponding to the switched operation mode,
wherein the POI information is provided based on a predetermined POI field that differs according to the operation mode, and a POI is selected from among a plurality of POIs based on a predetermined condition, and wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

24. A non-transitory computer readable recording medium storing computer-readable instructions that, when executed by a processor, cause the processor to:

collect information associated with a movement of a user terminal;

switch an operation mode between a plurality of operation modes comprising a driving mode and a walking mode based on the information associated with the movement of the user terminal;

obtain information associated with whether a device included in a vehicle malfunctions and transmit the information associated with whether a device included in the vehicle malfunctions to a server;

request a server for navigation information corresponding to the switched operation mode;

receive navigation information corresponding to the switched operation mode based on the information associated with whether a device included in the vehicle malfunctions from the server, the navigation information including Point of Interest (POI) information and information associated with a route; and displaying the received navigation information, wherein the POI information is provided based on a predetermined POI field that differs according to the operation mode, and a POI is selected from among a plurality of POIs based on a predetermined condition, and wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

25. A non-transitory computer readable recording medium storing computer- readable instructions that when executed by a processor, cause the processor to: collect information associated with a movement of a user terminal;

switch an operation mode between a plurality of operation modes comprising a driving mode and a walking mode based on the information associated with the movement of the user terminal;

obtain information associated with whether a device included in a vehicle malfunctions;

generate navigation information corresponding to the switched operation mode based on the information associated with whether a device included in the vehicle malfunctions, the navigation information including Point of Interest (POI) information and information associated with a route; and display the generated navigation information, wherein the POI information is provided based on a predetermined POI field that differs according to the operation mode, and a POI is selected from among a plurality of POIs based on a predetermined condition, and wherein the route is generated to comprise a road having the selected POI from a starting point to a destination, and a road type of the road having the selected POI is selected from among a plurality of road types based on the operation mode such that a first subset of road types are preferentially selected in the driving mode and a second subset of road types are preferentially selected in the walking mode.

* * * * *